United States Patent
Ackley

(10) Patent No.: US 7,137,637 B2
(45) Date of Patent: Nov. 21, 2006

(54) WHEEL FENDER WITH INTEGRAL TANK

(76) Inventor: Erick J. Ackley, 1516 Clover Cir., Melbourne, FL (US) 32935

( * ) Notice: Subject to any disclaimer, the term of this patent is extended or adjusted under 35 U.S.C. 154(b) by 25 days.

(21) Appl. No.: 10/383,604

(22) Filed: Mar. 7, 2003

(65) Prior Publication Data

US 2004/0094947 A1    May 20, 2004

Related U.S. Application Data

(60) Provisional application No. 60/426,688, filed on Nov. 15, 2002.

(51) Int. Cl.
  *B62D 25/18* (2006.01)
(52) U.S. Cl. .................... 280/152.1; 280/854; 180/219
(58) Field of Classification Search ............. 280/152.1, 280/152.2, 854, 158.1, 152.3, 848, 159, 304.3, 280/851, 849, 156, 853; 180/219, 220, 89.1; 224/423, 419, 427, 428
See application file for complete search history.

(56) References Cited

U.S. PATENT DOCUMENTS

| | | | |
|---|---|---|---|
| 707,922 A | 8/1902 | Hedstrom | |
| 4,577,719 A | 3/1986 | Nomura et al. | |
| 4,702,339 A | 10/1987 | Hayashi et al. | |
| 4,802,682 A | 2/1989 | Yasuji | |
| 4,901,813 A | 2/1990 | Kimura et al. | |
| 4,915,188 A | 4/1990 | Ota et al. | |
| 5,044,646 A | 9/1991 | Iiga et al. | |
| 6,378,643 B1* | 4/2002 | Galbraith et al. | 180/219 |
| 6,520,275 B1* | 2/2003 | Galbraith et al. | 180/219 |
| 6,729,516 B1* | 5/2004 | Hanagan | 224/423 |

FOREIGN PATENT DOCUMENTS

| | | |
|---|---|---|
| JP | 402136385 A | 5/1990 |
| JP | 402136386 A | 5/1990 |
| JP | 402144268 A | 6/1990 |
| JP | 404031190 A | 2/1992 |
| JP | 404166485 A | 6/1992 |

* cited by examiner

*Primary Examiner*—Hau Phan
(74) *Attorney, Agent, or Firm*—Akerman Senterfitt; Michael K. Dixon

(57) ABSTRACT

A fender for a motor vehicle, such as a motorcycle, having a tank for containing fluids, such as oil. The fender limits the amount of materials thrown by a rear wheel of the motor vehicle onto a rider and provides a reservoir for fluids used by the engine. The fender also increases the amount of free space located under the seat and proximate to an engine of the motor vehicle, thereby enabling engine components to be placed under the seat in a more protected position.

8 Claims, 4 Drawing Sheets

WHEEL FENDER WITH INTEGRAL TANK

CROSS-REFERENCE TO RELATED APPLICATION

This application claims the benefit of U.S. Provisional Application No. 60/426,688, filed Nov. 15, 2002.

FIELD OF THE INVENTION

The invention is directed generally to motor vehicles, and more particularly, to oil tanks usable with motor vehicles.

BACKGROUND

A conventional motorcycle includes a frame and is supported by front and rear wheels. A motorcycle also includes a motor that is often positioned in a cavity that is centrally located within the frame of the motorcycle. The cavity is formed by the supports forming the frame and is located beneath a seat for supporting a rider. Components necessary for operation of the motorcycle are typically positioned in the cavity and may be attached to the engine, mounting brackets, or the frame itself proximate to the cavity. In addition, an oil tank is often attached to the frame directly beneath the seat that supports a rider. The cavity in which a motor is mounted often does not include a housing or other structure. Rather, the cavity is open. As a result, the engine and related components are susceptible to being covered with corrosive and destructive elements, such as oil, salt, sand, water and other materials, commonly found on a roadway. Also, by positioning the components of the motorcycle in the cavity adequate areas for storage are not available.

Thus, a need exists for an alternative configuration for a motorcycle so that components of the motorcycle are protected from elements found on a roadway and adequate storage is provided.

SUMMARY OF THE INVENTION

The invention is directed to a fender for a motor vehicle. The fender may be a rear fender configured to be positioned proximate to a rear wheel of a motor vehicle. In other embodiments, the fender may be configured to be placed proximate to other wheels of motor vehicles, such as front wheels. The fender is formed from a body that is configured to be placed in close proximity with a rear wheel of the motor vehicle to limit the amount of material thrown by the rear wheel onto the rider or the motor vehicle, or both. The fender may also include a housing attached to the body and forming a cavity for containing a fluid. The housing may include one or more orifices for receiving or releasing a fluid, or both. The body of the fender may be curved around the axis about which the rear wheel rotates so that a first end of the body of the fender is positioned proximate to an uppermost position of the rear wheel of the motorcycle and a second end of the body is positioned proximate to a rear portion of the rear wheel where the rear wheel contacts a ground surface. The body of the fender may also be curved so that a first edge of the body of the fender is positioned generally parallel to a first side of a rear wheel and a second edge of the body of the fender is positioned generally parallel to a second side of the rear wheel, wherein the first side of the rear wheel is generally opposite to the second side of the rear wheel.

In one embodiment, the fender is configured to be coupled to a motorcycle proximate to a rear wheel, and the cavity in the fender may contain oil, thereby eliminating the need to couple an oil tank to the motorcycle proximate to the engine. By incorporating the oil tank in the fender, space under the seat of the motorcycle is opened. Engine components that are susceptible to failure from destructive materials typically present on a roadway may be positioned under the seat, thereby at least partially protecting the components from the elements.

BRIEF DESCRIPTION OF THE DRAWINGS

The accompanying drawings, which are incorporated in and form a part of the specification, illustrate preferred embodiments of the presently disclosed invention(s) and, together with the description, disclose the principles of the invention(s). These several illustrative figures include the following.

DETAILED DESCRIPTION OF THE INVENTION

Figure 1:
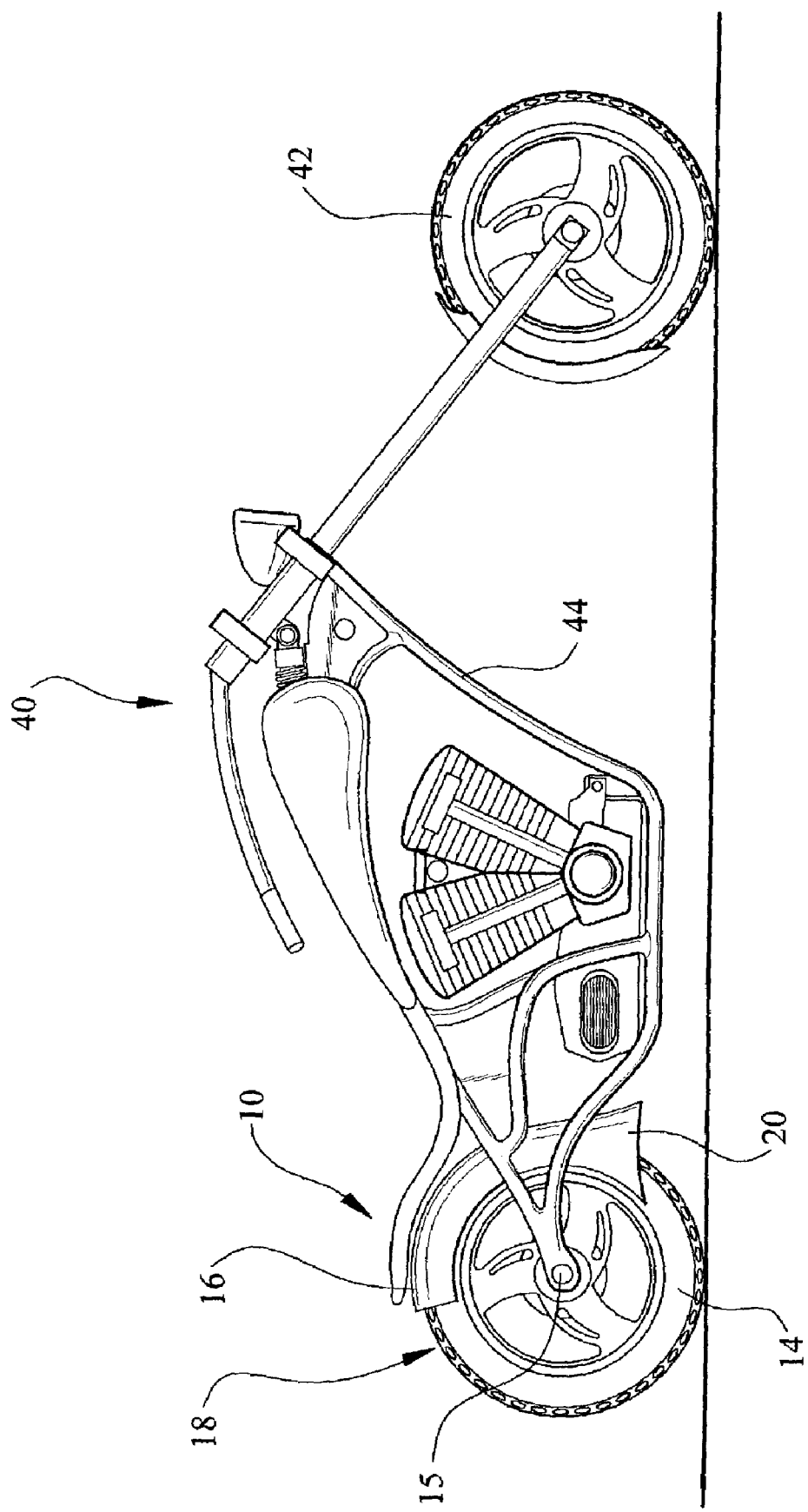
FIG. 1 is a side view of a motorcycle according to the invention.

FIGS. 1–5 show a fender 10 of this invention. Fender 10 may be configured to be a fender; however, fender 10 is not limited to a rear fender, but may also be a front fender usable with a front wheel or a fender for another type of wheel. Fender 10 generally is formed from a body 12 and a housing 30 that forms a cavity 32 for containing fluids. Fender 10 may be configured to be placed proximate to a rear tire of a motor vehicle 40. Motor vehicle 40 may be any motor vehicle. In one embodiment, fender 10 may be configured to be placed proximate to a rear tire of a motorcycle. Fender 10 may be formed from a body 12 configured to be placed in close proximity with a rear wheel of a motorcycle 40 to protect a rider and motorcycle 40 from materials kicked up by the rear wheel from a roadway surface. Body 12 may curved, as shown in FIG. 1, to cover a portion rear wheel 14 so that a first end 16 of body 12 is positioned proximate to an uppermost position 18 of a rear wheel 14 of the motorcycle and a second end 20 of body 12 is positioned proximate to a portion of the rear wheel 14 where the rear wheel 14 contacts a ground surface. In this position, body 12 is curved around axis 15. Body 12 is not limited to this configuration. Rather, body 12 may be longer or shorter than body 12 shown in FIG. 1. In addition, body 12 may be a combination of one or more curved or straight edges.

Body 12 may also be curved so that a first edge 22 of body 12 is positioned generally parallel to a first side 24 of rear wheel 14 of the motorcycle, and a second edge 26 of body 12 is positioned generally parallel to a second side 28 of rear wheel 14. First side 24 of rear wheel 14 is generally opposite to second side 28 of rear wheel 14. In another embodiment, body 12 may have a generally flat cross-section or other configuration.

Fender 10 may also include a housing 30 attached to body 12 and forming a cavity 32 for containing a fluid, such as, but not limited to oil, water, engine coolant, and other fluids. Cavity 32 may be configured to have various capacities, such as, but not limited to about one cup to about one gallon or more. Housing 30 is not limited to a simple cavity 32. Instead, housing 30 may form two or more cavities. Housing 30 may be integrally formed together with body 12 or may be formed separately and coupled to body 12. In one embodiment, housing 30 is positioned on an outside surface 34 of body 12. However, housing 30 may be positioned on another surface of body 12. Housing 30 may have any configuration that does not interfere with operation of the motor vehicle to which housing 30 may be attached. Housing 30 may include one or more brackets 36 enabling housing 30 to be attached to a motor vehicle. Bracket 36 may have any configuration.

Housing 30 also includes a one or more orifices 38 for receiving or releasing a fluid, or both. More specifically, housing 30 may have a single orifice 38 for receiving and releasing a fluid, or housing 30 may have one or more inlets 38 for receiving a fluid into cavity 32 or may have one or more outlets 38 for releasing a fluid from cavity 32. Housing 30 may also have an orifice 38 used solely for draining oil from cavity 32. A valve or other device may be coupled to orifice 38 for controlling the release of fluids from cavity 32. Housing 30 may also include a fill cap 39 for receiving a fluid.

The components of fender 10 may be formed from any resilient material, such as, but not limited to, aluminum, steel, stainless steel, galvanized steel, titanium, composites, plastics, any combination of these materials or other materials. Each component may be formed from the same material. Alternatively, the components may be formed from different materials.

Fender 10 may be releasably or permanently coupled to a motor vehicle. For instance, fender 10 may be releasably coupled to a motor vehicle using nuts and bolts, quick connect mechanisms, cable, or other such devices. Fender 10 may be permanently coupled to a motor vehicle using any type of weld compatible with the material forming fender 10 or other permanent coupling mechanism. Fender 10 may or may not be painted and may or may not have a finished surface. Fender 10 may be painted using one or more colors and may include decals or other appearance enhancing items.

Figure 2:
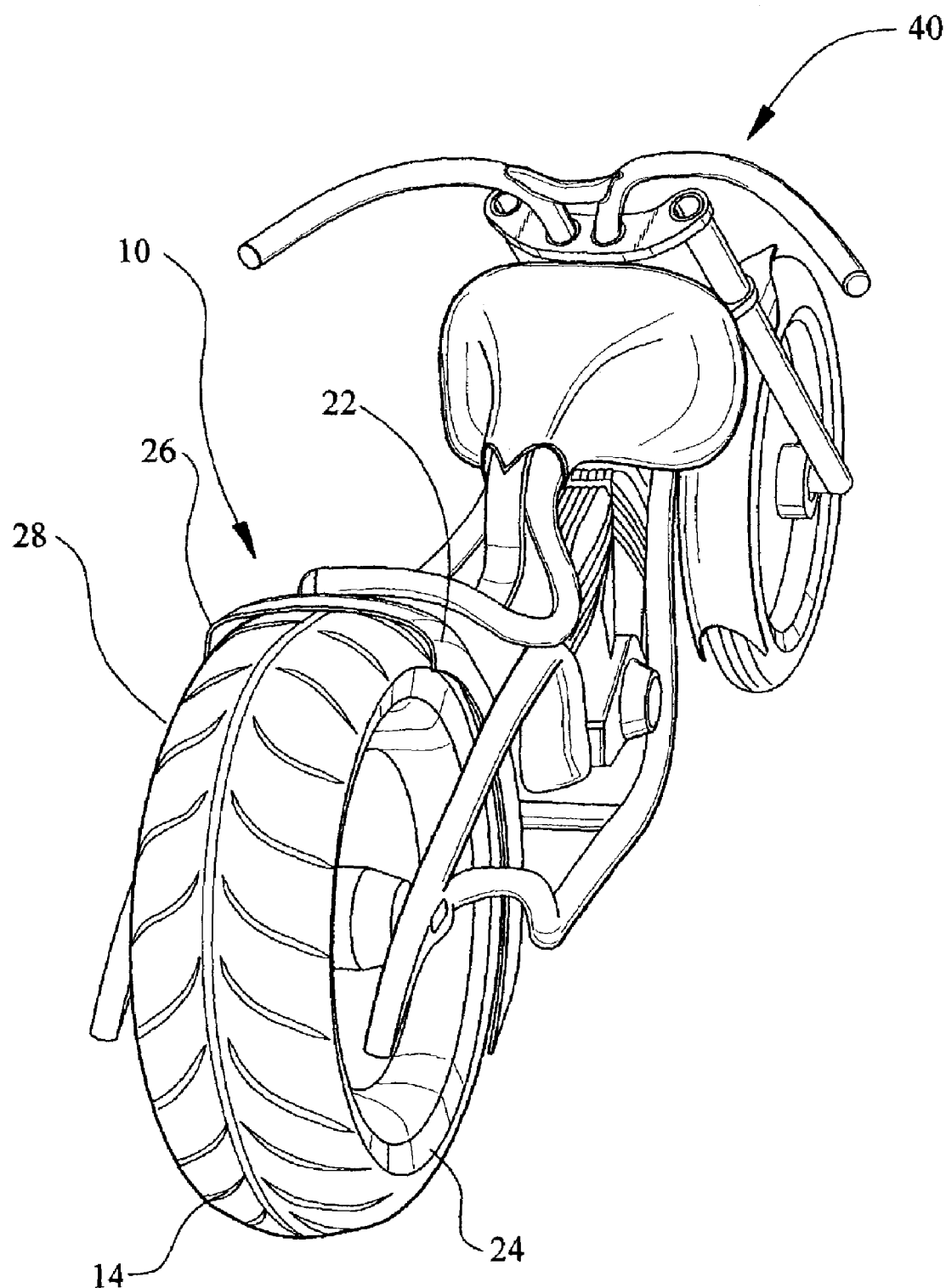
FIG. 2 is a rear perspective view of the motorcycle of FIG. 1 according to the invention.
Figure 3:
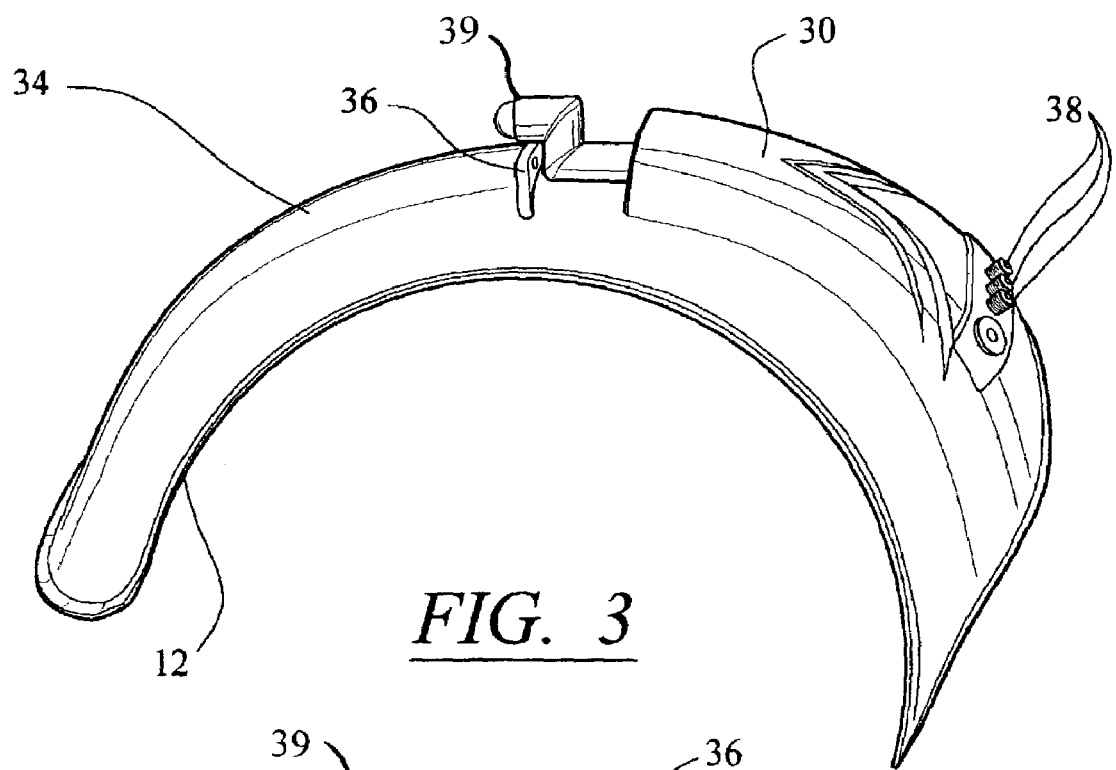
FIG. 3 is a side perspective view of the fender.
Figure 4:
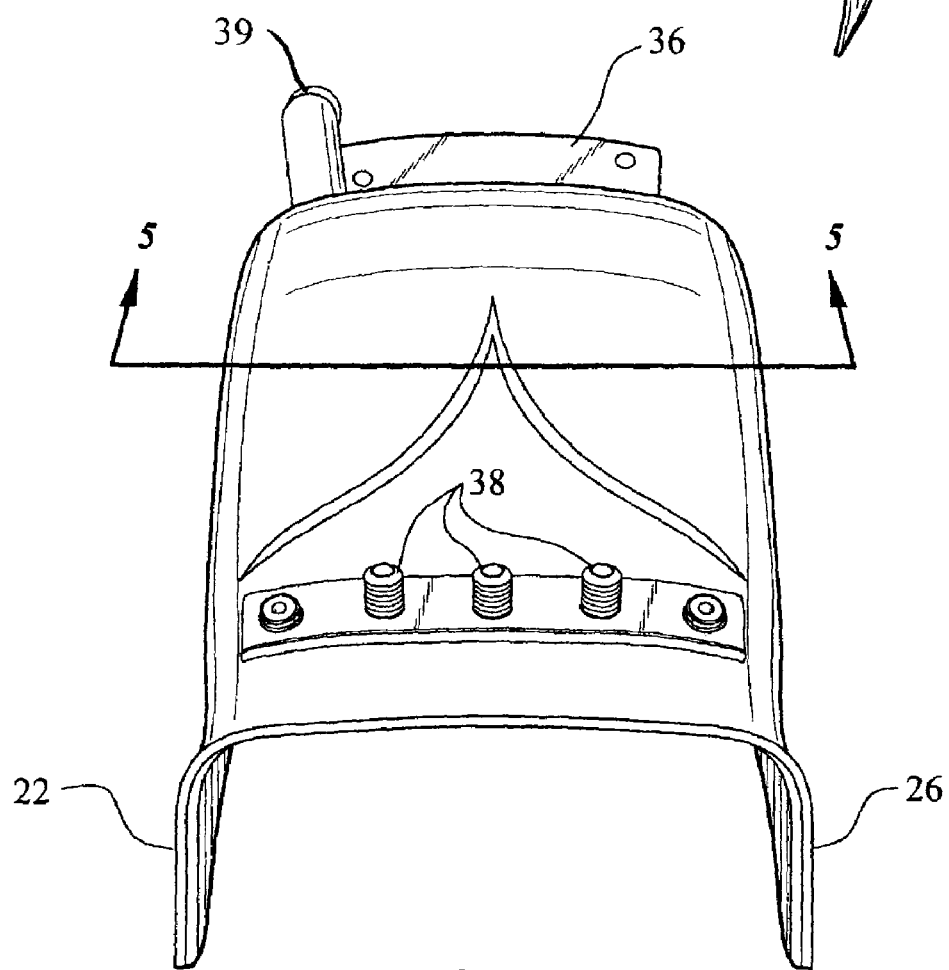
FIG. 4 is a bottom view according to the invention.
Figure 5:
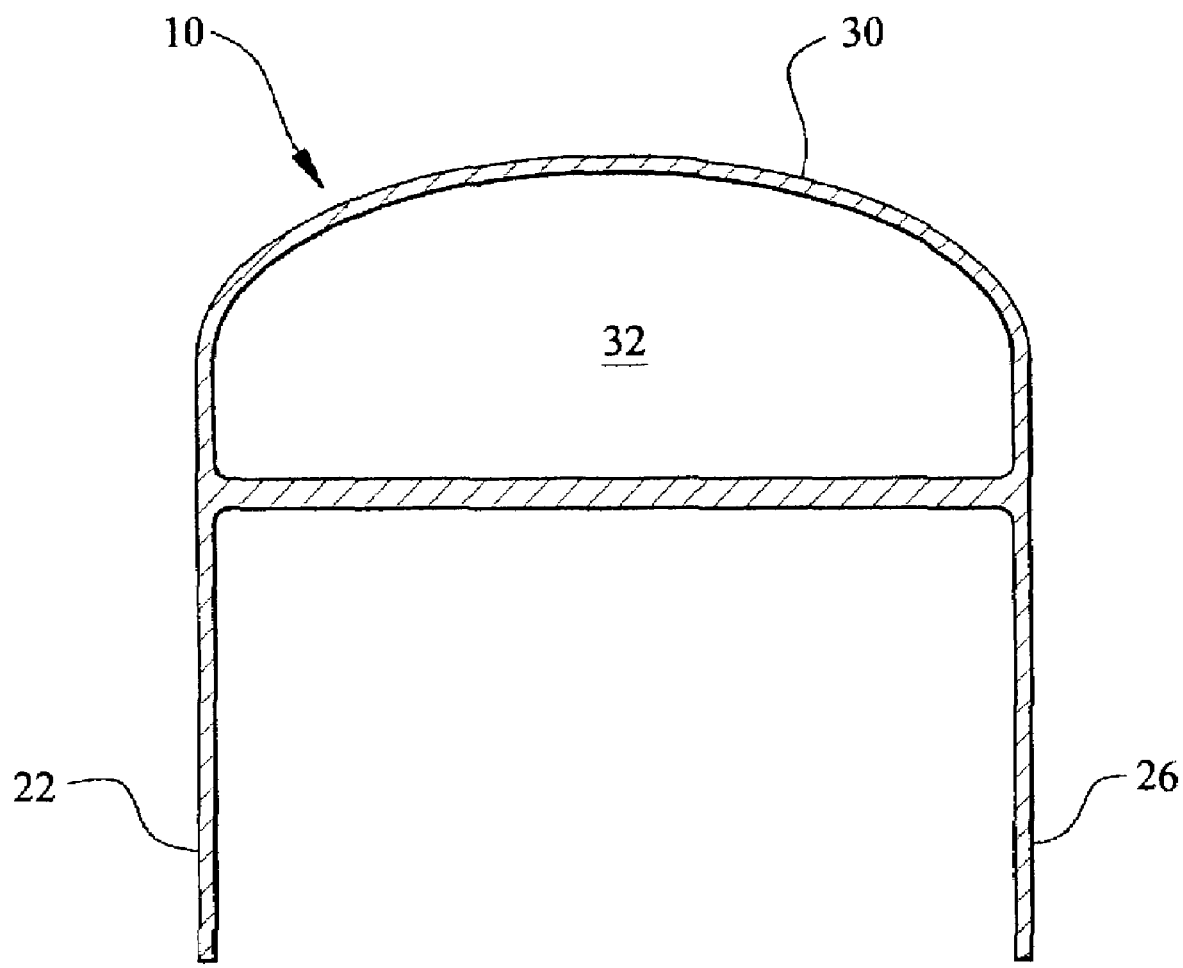
FIG. 5 is a cross-section of the fender taken at 5—5 in FIG. 4.

In one embodiment, fender 10 is coupled to a motorcycle 40, as shown in FIGS. 1 and 2, and cavity 32 is configured to function as an oil tank. However, cavity 32 may contain other materials as needed. Motorcycle 40 is composed of front and rear wheels, 42 and 14 respectively, that support a frame 44. Positioning an oil tank in fender 10 increases the amount of open space near the engine of the motorcycle. In most conventional motorcycles, the oil tank 32 is positioned directly beneath the seat. However, incorporating the oil tank 32 in fender 10 allows electronic components to be positioned in the space typically occupied by an oil tank. This configuration allows for these components to be secured under the seat and out of the elements (sun, rain, salt spray, etc.), thereby providing for a more secure and reliable system.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A fender for a motorcycle, comprising:
  a body coupled to the motorcycle in close proximity with a rear wheel of the motorcycle to limit an amount of material thrown by the rear wheel from contacting an engine of the motorcycle;
  a cavity integrally formed in the body for containing a an engine oil;
  a fill cap for receiving the engine oil positioned proximate to an outer surface of the body;
  an orifice for draining the engine oil positioned proximate to the outer surface of the body;
  wherein the body is curved around an axis of the rear wheel so that a first end of the body is positioned proximate to an uppermost position of the rear wheel of the motorcycle and a second end of the body extends beyond the axis of the rear wheel; and
  wherein the cavity for containing the engine oil is positioned between the axis of the rear wheel and the engine of the motorcycle and at least a portion of the cavity is positioned beyond the axis of the rear wheel.

2. The fender of claim 1, wherein the body is curved around the axis of the rear wheel so that the first end of the body is positioned proximate to an uppermost position of the rear wheel of the motorcycle and the second end of the body is positioned proximate to a portion of the rear wheel where the rear wheel contacts a ground surface.

3. The fender of claim 1, wherein the body is curved so that a first edge of the body is positioned generally parallel to a first side of the rear wheel of the motorcycle and a second edge of the body is positioned generally parallel to a second side of the rear wheel, wherein the first side of the rear wheel is generally opposite to the second side of the rear wheel.

4. The fender of claim 1, further comprising at least one bracket for coupling the fender to a frame of the motorcycle.

5. A motorcycle, comprising:
  a frame supported by at least one front wheel and one rear wheel; and
  a fender coupled to the frame and comprising:
    a body formed to be placed in close proximity with the rear wheel of the motorcycle to limit an amount of material kicked up by the rear wheel;
    a cavity integrally formed in the body for containing an engine oil;
    a fill cap for receiving the engine oil positioned proximate to an outer surface of the body;
    an orifice for draining the engine oil positioned proximate to the outer surface of the body;
    wherein the body is curved around an axis of the rear wheel so that a first end of the body is positioned proximate to an uppermost position of the rear wheel of the motorcycle and a second end of the body extends beyond the axis of the rear wheel; and
    wherein the cavity for containing the engine oil is positioned between the axis of the rear wheel and an engine of the motorcycle and at least a portion of the cavity is positioned beyond the axis of the rear wheel.

6. The motorcycle of claim 5, wherein the body is curved so that the first end of the body is positioned proximate to an uppermost position of the rear wheel of the motorcycle and the second end of the body is positioned proximate to a portion of the rear wheel where the rear wheel contacts a ground surface.

7. The motorcycle of claim 5, wherein the body is curved so that a first edge of the body is positioned generally parallel to a first side of the rear wheel of the motorcycle and a second edge of the body is positioned generally parallel to a second side of the rear wheel, wherein the first side of the rear wheel is generally opposite to the second side of the rear wheel.

8. The motorcycle of claim 5, further comprising at least one bracket for coupling the fender to a frame of the motorcycle.

* * * * *

UNITED STATES PATENT AND TRADEMARK OFFICE
CERTIFICATE OF CORRECTION

| | | |
|---|---|---|
| PATENT NO. | : 7,137,637 B2 | Page 1 of 1 |
| APPLICATION NO. | : 10/383604 | |
| DATED | : November 21, 2006 | |
| INVENTOR(S) | : Erick J. Ackley | |

It is certified that error appears in the above-identified patent and that said Letters Patent is hereby corrected as shown below:

In the claims:

Claim 1, column 3, line 66, after "containing" delete "a".

Signed and Sealed this

Seventh Day of August, 2007

JON W. DUDAS
*Director of the United States Patent and Trademark Office*